United States Patent
Taherzadeh Boroujeni et al.

(10) Patent No.: US 12,207,287 B2
(45) Date of Patent: Jan. 21, 2025

(54) GROUP-COMMON DYNAMIC INDICATION OF PHYSICAL UPLINK CONTROL CHANNEL REPETITION FACTOR

(71) Applicant: QUALCOMM Incorporated, San Diego, CA (US)

(72) Inventors: Mahmoud Taherzadeh Boroujeni, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 415 days.

(21) Appl. No.: 17/648,102

(22) Filed: Jan. 14, 2022

(65) Prior Publication Data
US 2022/0240261 A1    Jul. 28, 2022

Related U.S. Application Data

(60) Provisional application No. 63/140,669, filed on Jan. 22, 2021.

(51) Int. Cl.
*H04W 4/00* (2018.01)
*H04W 72/044* (2023.01)
*H04W 72/21* (2023.01)
*H04W 72/23* (2023.01)
*H04W 72/542* (2023.01)

(52) U.S. Cl.
CPC ....... *H04W 72/542* (2023.01); *H04W 72/044* (2013.01); *H04W 72/21* (2023.01); *H04W 72/23* (2023.01)

(58) Field of Classification Search
CPC ............ H04W 72/085; H04W 72/044; H04W 72/0413; H04W 72/042
USPC ........................................................ 370/329
See application file for complete search history.

(56) References Cited

U.S. PATENT DOCUMENTS

| | | | |
|---|---|---|---|
| 11,963,116 B2* | 4/2024 | Yokomakura | H04W 72/02 |
| 11,963,140 B2* | 4/2024 | Liu | H04W 72/044 |
| 2015/0230211 A1* | 8/2015 | You | H04L 5/0051 370/330 |
| 2017/0134880 A1* | 5/2017 | Rico Alvarino | H04L 5/0007 |
| 2019/0306846 A1* | 10/2019 | Luo | H04W 72/21 |
| 2020/0007296 A1* | 1/2020 | Papasakellariou | H04L 1/1854 |
| 2021/0160826 A1* | 5/2021 | Bae | H04W 72/23 |
| 2021/0212042 A1* | 7/2021 | Zhang | H04W 74/0833 |
| 2021/0250772 A1* | 8/2021 | Farag | H04W 16/02 |
| 2021/0329701 A1* | 10/2021 | Lei | H04W 74/0891 |

(Continued)

*Primary Examiner* — Marceau Milord
(74) *Attorney, Agent, or Firm* — Procopio, Cory, Hargreaves & Savitch

(57) ABSTRACT

Aspects presented herein may enable a network entity, such as a base station or a component of a base station, to indicate a PUCCH repetition factor to a set of UEs via group-common DCI. In one aspect, a network entity transmits, to a set of UEs, an indication associated with a number of PUCCH retransmissions via group-common DCI. The network entity receives, from one or more UEs in the set of UEs, one or more PUCCH retransmissions based on the transmitted indication. In another aspect, a UE receives, from a network entity, an indication associated with a number of PUCCH retransmissions via group-common DCI. The UE transmits, to the network entity, one or more PUCCH retransmissions based on the received indication.

28 Claims, 12 Drawing Sheets

(56) References Cited

U.S. PATENT DOCUMENTS

| | | | |
|---|---|---|---|
| 2021/0360616 A1* | 11/2021 | Yi | H04L 5/0012 |
| 2022/0053289 A1* | 2/2022 | Liu | H04W 72/044 |
| 2022/0086826 A1* | 3/2022 | Huang | H04W 8/24 |
| 2022/0124672 A1* | 4/2022 | Xu | H04W 72/23 |
| 2022/0124732 A1* | 4/2022 | Park | H04L 1/1854 |
| 2022/0124775 A1* | 4/2022 | Zhang | H04L 5/0044 |
| 2022/0124782 A1* | 4/2022 | Park | H04W 72/23 |
| 2022/0132543 A1* | 4/2022 | Bai | H04W 72/02 |
| 2022/0264547 A1* | 8/2022 | Wu | H04L 5/0048 |
| 2023/0284032 A1* | 9/2023 | Kim | H04W 16/14 370/329 |
| 2024/0064740 A1* | 2/2024 | Falkenberg | H04W 72/044 |

* cited by examiner

GROUP-COMMON DYNAMIC INDICATION OF PHYSICAL UPLINK CONTROL CHANNEL REPETITION FACTOR

CROSS REFERENCE TO RELATED APPLICATION(S)

This application claims the benefit of and priority to U.S. Provisional Application Ser. No. 63/140,669, entitled "GROUP-COMMON DYNAMIC INDICATION OF PHYSICAL UPLINK CONTROL CHANNEL REPETITION FACTOR" and filed on Jan. 22, 2021, which is expressly incorporated by reference herein in its entirety.

TECHNICAL FIELD

The present disclosure relates generally to communication systems, and more particularly, to wireless communication involving physical uplink control channel (PUCCH) repetition(s).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication of a network entity. The apparatus transmits, to a set of user equipments (UEs), an indication associated with a number of physical uplink control channel (PUCCH) retransmissions via group-common downlink control information (DCI). The apparatus receives, from one or more UEs in the set of UEs, one or more PUCCH retransmissions based on the transmitted indication.

In an aspect of the disclosure, a method, a computer-readable medium, and an apparatus are provided for wireless communication of a UE. The apparatus receives, from a network entity, an indication associated with a number of PUCCH retransmissions via a group-common DCI. The apparatus transmits, to the network entity, one or more PUCCH retransmissions based on the received indication.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
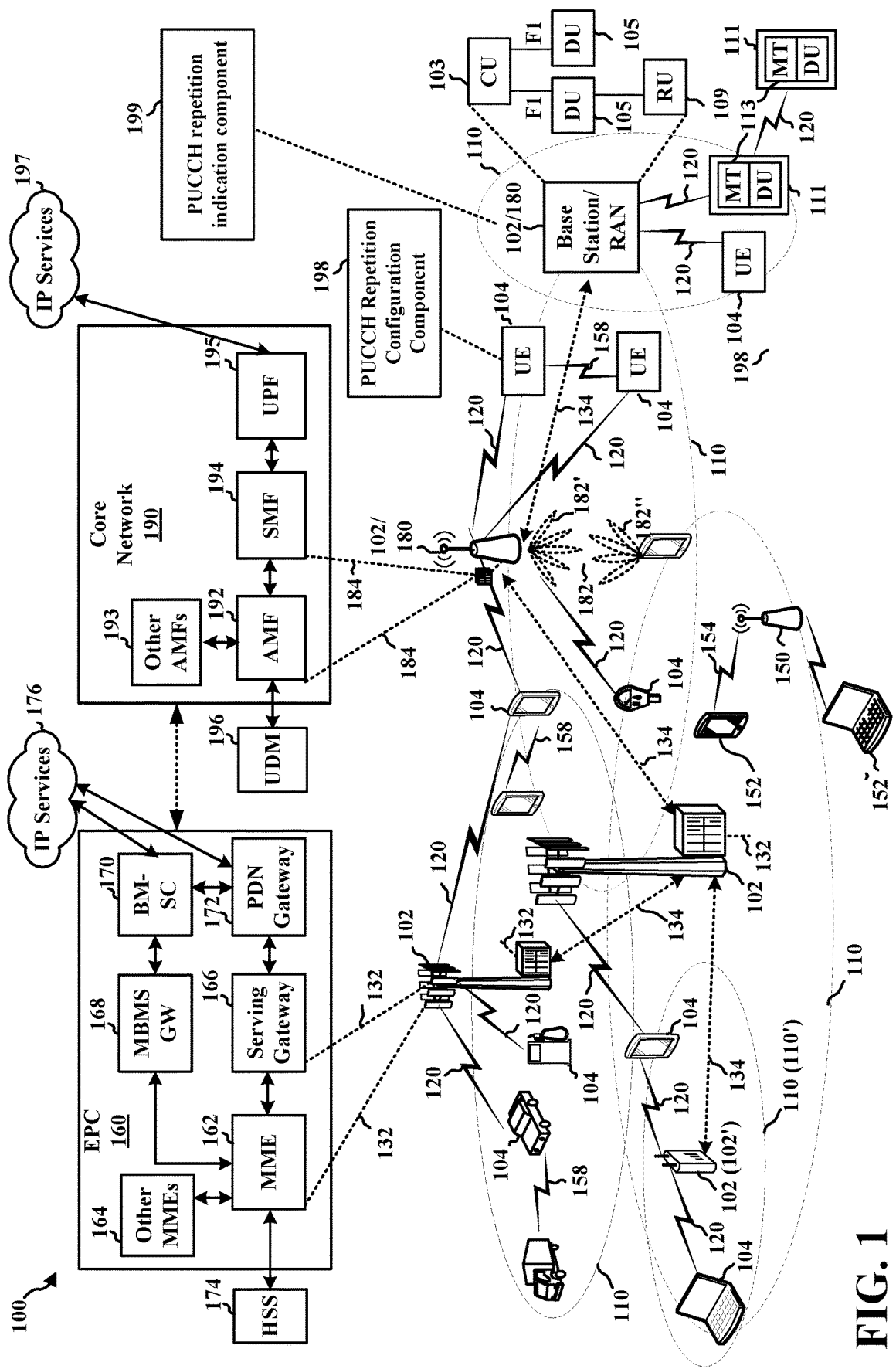
FIG. 1 is a diagram illustrating an example of a wireless communications system and an access network in accordance with aspects presented herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In certain aspects, the base station 102/180 may include a PUCCH repetition indication component 199 configured to indicate a PUCCH repetition factor to a set of UEs via group-common DCI. In one configuration, the PUCCH repetition indication component 199 may be configured to transmit, to a set of UEs, an indication associated with a number of PUCCH retransmissions via group-common DCI. In such configuration, the PUCCH repetition indication component 199 may receive, from one or more UEs in the set of UEs, one or more PUCCH retransmissions based on the transmitted indication. In certain aspects, the UE 104 may include a PUCCH repetition configuration component 198 configured to determine a number of PUCCH repetitions to be applied to a PUCCH transmission based on a PUCCH repetition factor received from a network entity via group-common DCI. In one configuration, the PUCCH repetition configuration component 198 may be configured to receive, from a network entity, an indication associated with a number of PUCCH retransmissions via a group-common DCI. In such configuration, the PUCCH repetition configuration component 198 may transmit, to the network entity, one or more PUCCH retransmissions based on the received indication.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

In some aspects, a network entity may include a base station, one or more components of a disaggregated or virtualized base station (such as a distributed unit or a central unit), a radio unit, a transmission reception point (TRP), a relay, an intelligent reflective surface (IRS), and/or a combination thereof. For example, a base station 102 or 180 may be referred as a RAN and may include aggregated or disaggregated components. As an example of a disaggregated RAN, a base station may include a central/centralized unit (CU) 103, one or more distributed units (DU) 105, and/or one or more radio units (RU) 109, as illustrated in FIG. 1. A RAN may be disaggregated with a split between an RU 109 and an aggregated CU/DU. A RAN may be disaggregated with a split between the CU 103, the DU 105, and the RU 109. A RAN may be disaggregated with a split between the CU 103 and an aggregated DU/RU. The CU 103 and the one or more DUs 105 may be connected via an F1 interface. A DU 105 and an RU 109 may be connected via a fronthaul interface. A connection between the CU 103 and a DU 105 may be referred to as a midhaul, and a connection between a DU 105 and an RU 109 may be referred to as a fronthaul. The connection between the CU 103 and the core network may be referred to as the backhaul. The RAN may be based on a functional split between various components of the RAN, e.g., between the CU 103, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 103 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 103 and a DU 105. IAB nodes 111 may include a DU 105 and a mobile termination (MT) 113. The DU 105 of an IAB node 111 may operate as a parent node, and the MT 113 may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2A:
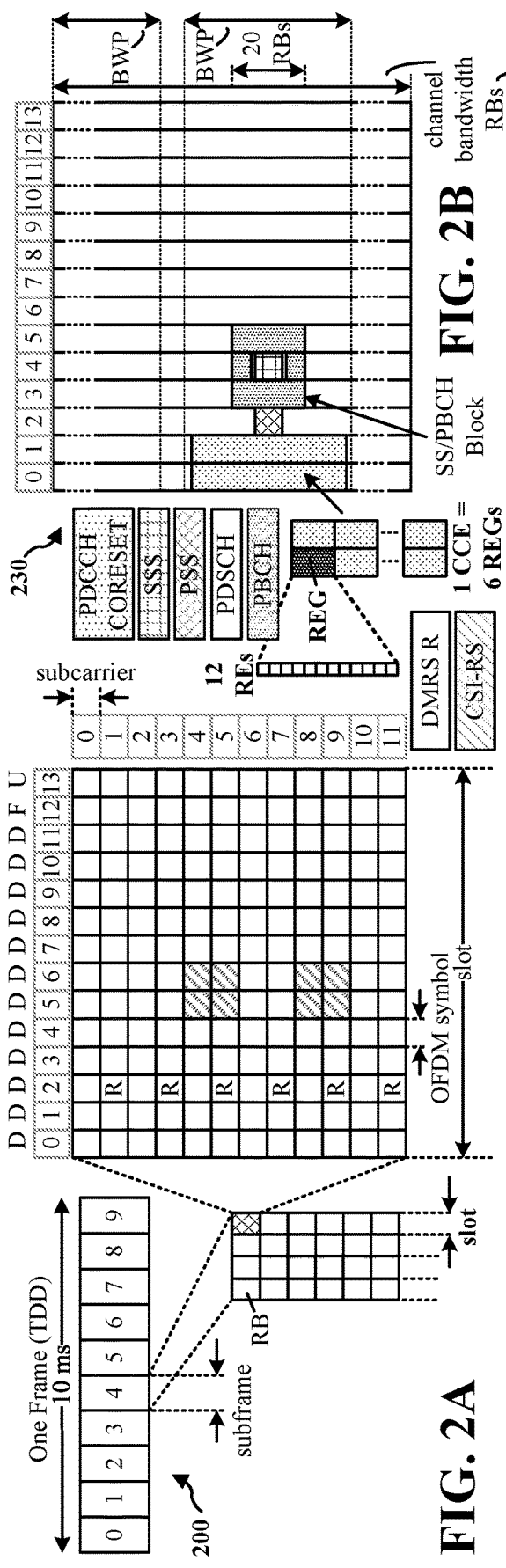
FIG. 2A is a diagram illustrating an example of a first frame, in accordance with various aspects of the present disclosure.
Figure 2B:
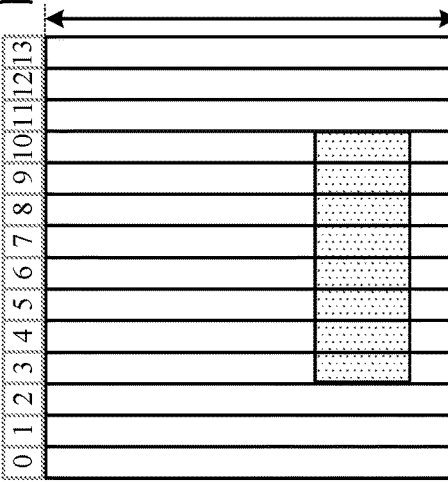
FIG. 2B is a diagram illustrating an example of DL channels within a subframe, in accordance with various aspects of the present disclosure.
Figure 2C:
FIG. 2C is a diagram illustrating an example of a second frame, in accordance with various aspects of the present disclosure.
Figure 2D:
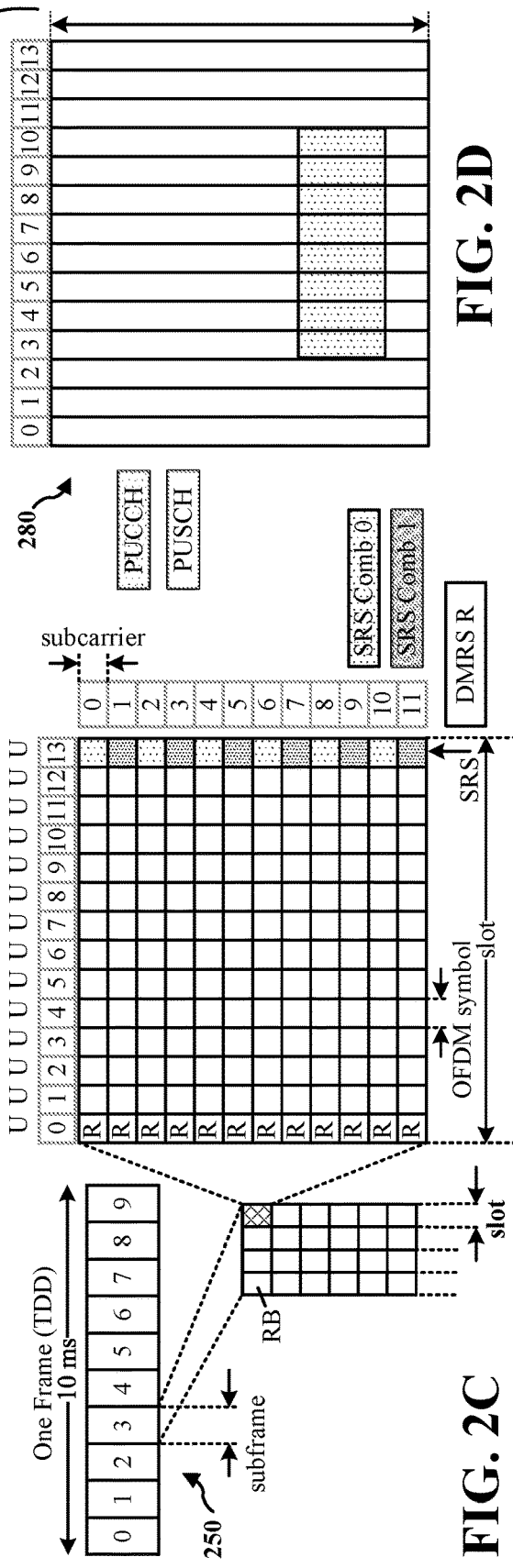
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15[kHz]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame.

The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
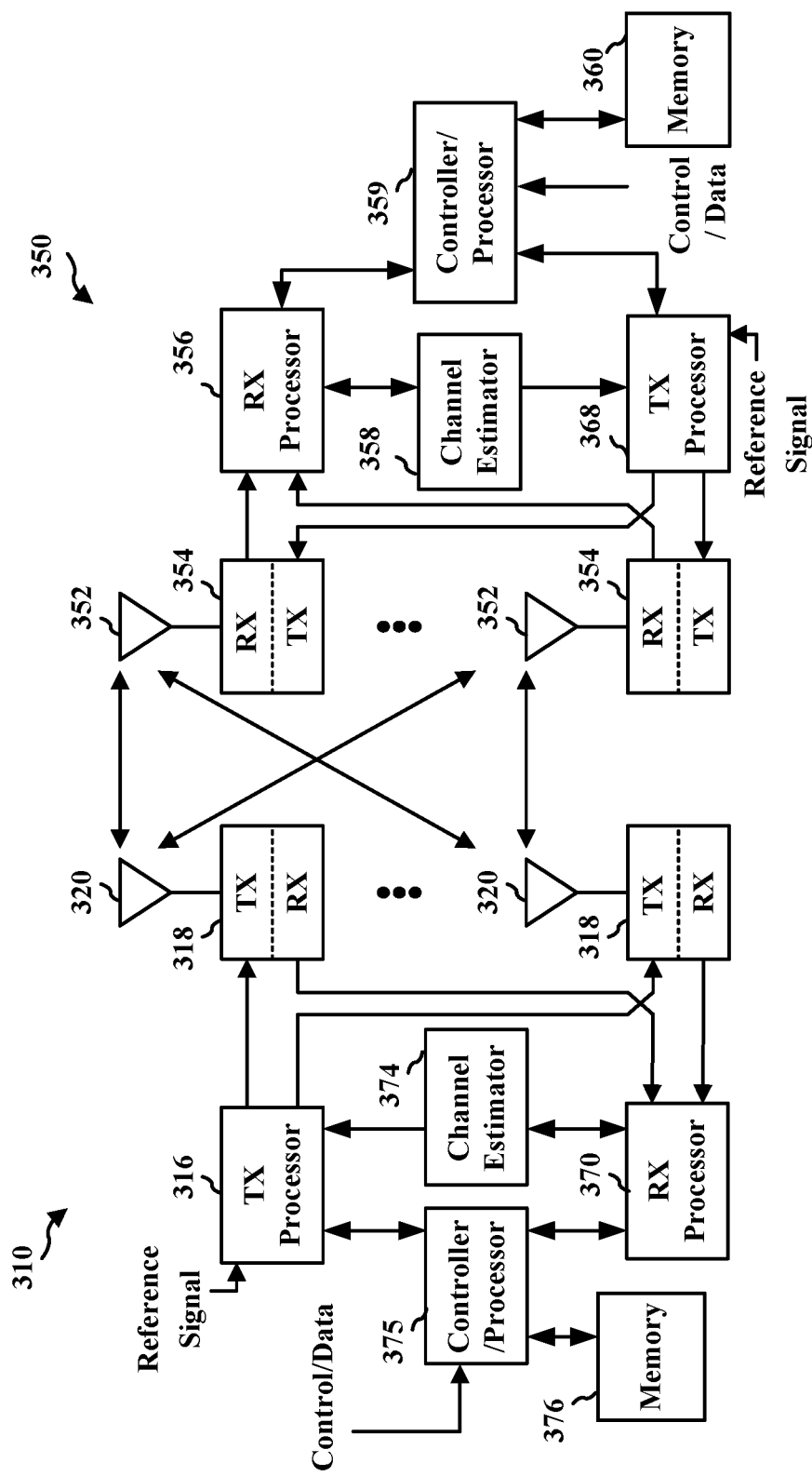
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The UL transmission is processed at the base station 310 in a manner similar to that described in connection with the receiver function at the UE 350. Each receiver 318 RX receives a signal through its respective antenna 320. Each receiver 318 RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the PUCCH repetition configuration component 198 of FIG. 1.

At least one of the TX processor 316, the RX processor 370, and the controller/processor 375 may be configured to perform aspects in connection with the PUCCH repetition indication component 199 of FIG. 1.

To improve data transmission and successful data transmission rate, a UE may be configured to transmit data signals and/or control signals (e.g., physical uplink shared channel (PUSCH), physical uplink control channel (PUCCH), etc.) with repetitions/retransmissions (e.g., PUSCH repetitions, PUCCH repetitions, etc.). For example, a UE may be configured to transmit a PUCCH followed by N (e.g., 2, 4, 5, etc.) repetitions. Thus, after the UE transmits the PUCCH, the UE may transmit N PUCCHs. Transmitting data with repetitions of the data may increase the success rate of the transmission, as the data may have a higher chance of being received by the receiving side. For purposes of the present disclosure, the term "repetition" and the term "retransmission" may be used interchangeably, which may refer to a copy or a duplication of data that may be transmitted more than once. For example, a PUCCH repetition and a PUCCH retransmission may both refer to a copy/duplication of a PUCCH that is transmitted by a UE after the UE transmits the PUCCH.

Figure 4:
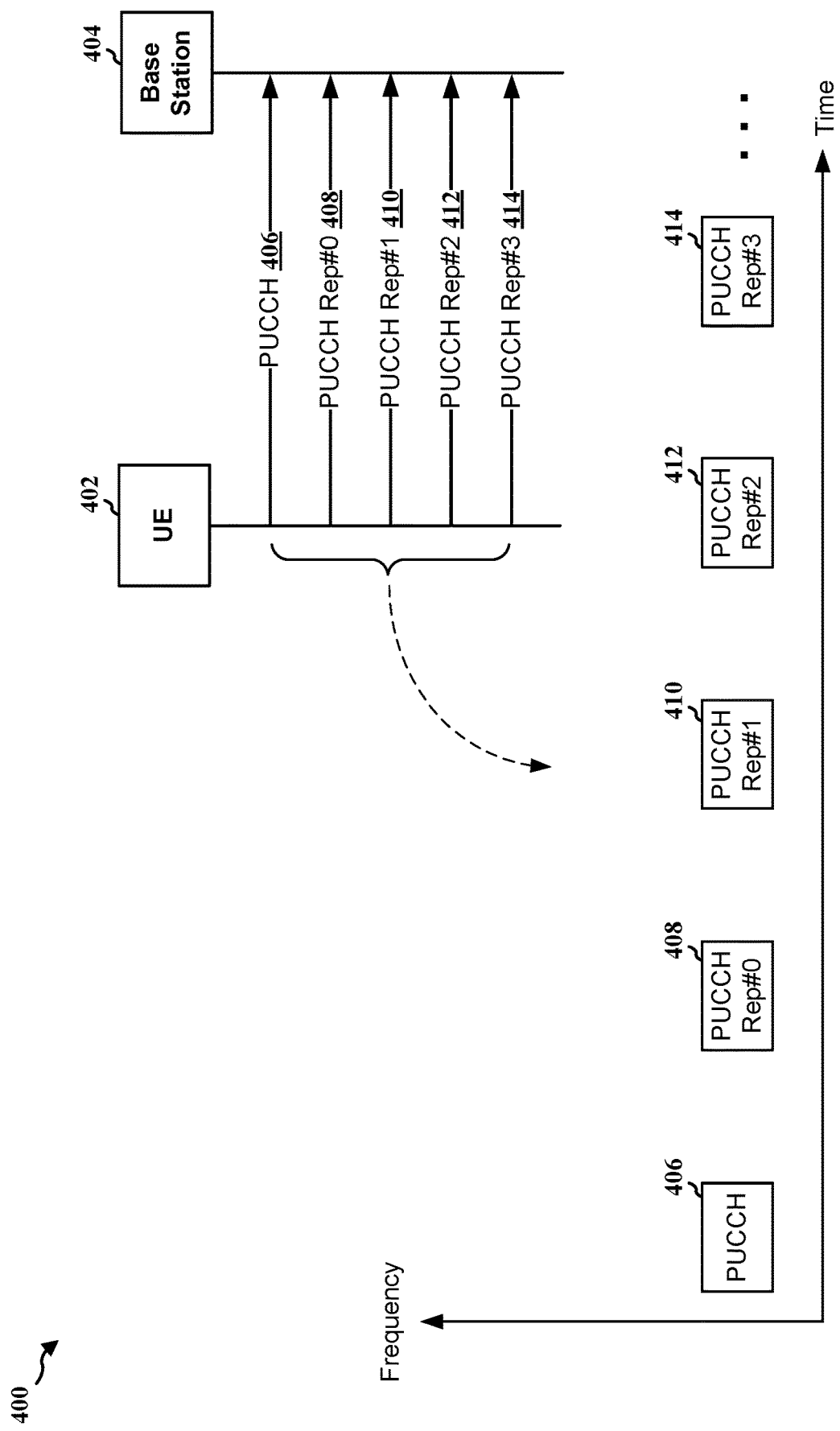
FIG. 4 is a diagram illustrating an example of a data transmission involving PUCCH repetitions according to aspects of the present disclosure.

FIG. 4 is a diagram 400 illustrating an example of a data transmission involving PUCCH repetitions according to aspects of the present disclosure. A UE 402 may be configured to transmit a PUCCH 406 with four (4) PUCCH repetitions/retransmissions (e.g., a PUCCH repetition factor corresponds to four) to a base station 404 (which may also be referred to as a network entity). The UE 402 may initially transmit the PUCCH 406, then the UE 402 may transmit a first PUCCH repetition 408 (e.g., repetition #0), a second PUCCH repetition 410 (e.g., repetition #1), a third PUCCH repetition 412 (e.g., repetition #2), and a fourth PUCCH repetition 414 (e.g., repetition #3). The base station 404 may configure/indicate the PUCCH repetition and/or the number of PUCCH repetitions for the UE 402 dynamically. In some examples, demodulation reference signal (DMRS) bundling may be applied to PUCCH repetitions, which may enable a better channel estimation and/or PUCCH transmission for wireless devices. Under DMRS bundling, joint channel estimation may be performed at UE side, which may improve the performance of channel estimation and thus coverage.

A base station may transmit various control information to a UE using downlink control information (DCI) in a PDCCH, such as an uplink grant (e.g., scheduling for a PUSCH), a downlink scheduling (e.g., scheduling for a PDSCH), uplink power control commands, and/or RACH responses, etc. In some examples, to reduce signaling overhead, a base station may transmit a group-common DCI to a set of UEs, such that the base station may transmit DCI to multiple UEs in one message. After the set of UEs receives the group-common DCI, each UE within the set of UEs may apply control information included in the group-common DCI that is applicable to the UE. For example, the group-common DCI may carry some control information that is applicable to one UE but inapplicable to another UE. Thus, if control information is applicable to a UE, the UE may apply it or determine whether to apply it. However, if control information is inapplicable to a UE, the UE may skip applying it.

Aspects presented herein may enable a base station to transmit an indication associated with a number of PUCCH repetitions to multiple UEs in a group-common DCI to reduce signaling overhead and/or to improve communication efficiency. Aspects presented herein may enable different UEs to apply a different number of PUCCH repetitions after receiving an indication associated with a number of PUCCH repetitions in a group-common DCI from a base station, such that the base station may avoid transmitting separate DCI messages to different UEs for configuring a different number of PUCCH repetitions for different UEs.

Figure 5:
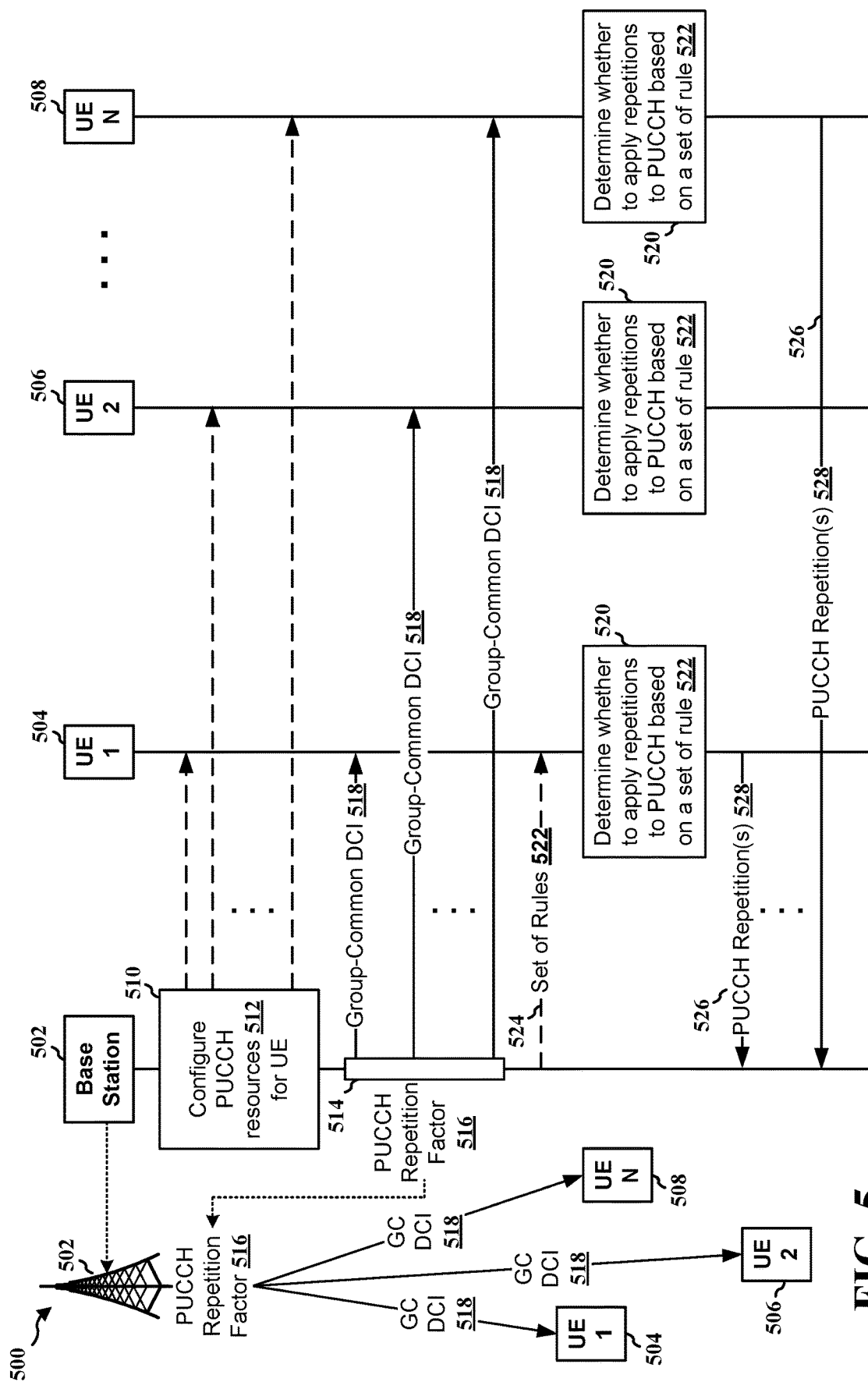
FIG. 5 is a communication flow illustrating an example of a base station indicating a PUCCH repetition factor to multiple UEs using group-common DCI according to aspects of the present disclosure.

FIG. 5 is a communication flow 500 illustrating an example of a base station indicating a PUCCH repetition factor (e.g., number of PUCCH repetitions) to multiple UEs using group-common DCI according to aspects of the present disclosure.

At 510, a base station 502 (which may also be referred to as a network entity) may configure a set of PUCCH resources 512 for a set of UEs, which may include a first UE 504, a second UE 506, and up to an $N^{th}$ UE 508, etc. One or more UEs within the set of UEs may use the configured PUCCH resources 512 for transmitting a PUCCH and/or PUCCH repetitions. As described in connection with FIG. 1, in some aspects, a base station include disaggregated components, such as a CU, one or more DUs, one or more Rus, one or more TRPs, one or more relays, one or more intelligent reflective surfaces, and/or a combination thereof. As such, for purposes of the present disclosure, the term "base station" may include component(s) of a base station. Thus, in some examples, the term "base station" may be used interchangeably with the term "network entity" or "network node," which may refer to one or more disaggregated components of a base station.

At 514, the base station 502 may transmit a group-common DCI message 518 to the set of UEs, which may include the first UE 504, the second UE 506, and up to the $N^{th}$ UE 508, etc. The group-common DCI message 518 may include a PUCCH repetition factor 516 in which one or more UEs in the set of UEs may apply. In one example, the repetition factor may be a bit string (e.g., 001, 011, etc.) corresponding to the binary expansion of the PUCCH repetition factor 516 (or {repetition factor–1} or {repetition factor–n} for some integer n). For example, the PUCCH repetition factor 516 may correspond to an integer X, where the base station 502 may expect one or more UEs in the set of UEs to transmit X PUCCH repetitions for their corresponding PUCCH or to transmit X−1 PUCCH repetitions for their corresponding PUCCH (e.g., if the original PUCCH is counted for the purpose of retransmission).

At 520, after receiving the group-common DCI 518 that includes the PUCCH repetition factor 516 from the base station 502, one or more UEs in the set of UEs, such as the first UE 504, the second UE 506, and the $N^{th}$ UE 508, may determine whether to apply the PUCCH repetition factor 516 to their corresponding PUCCH transmissions or whether to update their PUCCH repetition numbers, e.g., if the number of repetitions indicated by the PUCCH repetition factor 516 is different from a repetition number currently applied by the UE.

In some examples, a UE (e.g., 504, 506 or 508) may determine whether to apply the PUCCH repetition factor 516 based on a set of rules 522 (e.g., or restrictions) defined at the UE (e.g., through a pre-configuration) or configured for the UE (e.g., by the base station 502). For example, the set of rules 522 may be associated with uplink control information (UCI), where the set of rules 522 may indicate that a UE may apply the PUCCH repetition factor 516 to its PUCCH repetitions (e.g., to transmit X PUCCH repetitions) if the PUCCH and/or the PUCCH repetitions that are to be transmitted by the UE include UCI and/or certain UCI content(s) (e.g., whether the UCI is carrying channel state information (CSI) feedback), and/or the UE may apply the PUCCH repetition factor 516 to its PUCCH repetition if the PUCCH repetitions are carrying UCI that meets a UCI size threshold (e.g., the PUCCH repetitions may apply to PUCCH carrying UCI that is below the UCI size threshold), etc. Thus, the UE may apply the PUCCH repetition factor 516 for PUCCH repetitions that include the UCI or certain UCI content(s), and the UE may skip applying the PUCCH repetition factor 516 for PUCCH repetitions that do not include the UCI or certain UCI content(s), etc.

In another example, the set of rules 522 may be associated with a PUCCH format, where the set of rules 522 may indicate that a UE may apply the PUCCH repetition factor 516 to its PUCCH repetitions (e.g., to transmit X PUCCH repetitions) if the PUCCH and/or the PUCCH repetitions that are to be transmitted by the UE use one or more PUCCH formats defined for the UE. For example, the set of rules 522 may indicate that the UE may apply the PUCCH repetition factor 516 for PUCCH repetitions that are transmitted in a short PUCCH format. Thus, the UE may apply the PUCCH repetition factor 516 for PUCCH repetitions that use the short PUCCH format, and the UE may skip applying the PUCCH repetition factor 516 for PUCCH repetitions that do not use the short PUCCH format, etc.

In another example, the set of rules 522 may be associated with at least one of subcarrier spacing (SCS), frequency range, carrier frequency, and/or a bandwidth part (BWP) that are used for the PUCCH retransmissions. For example, the set of rules 522 may indicate that the UE may apply the PUCCH repetition factor 516 for PUCCH repetitions that are transmitted using a specified subcarrier spacing, using a specified frequency range, using a specified carrier frequency, using a specified BWP, or a combination thereof. Thus, the UE may apply the PUCCH repetition factor 516 for PUCCH repetitions that meet the specified criteria, and the UE may skip applying the PUCCH repetition factor 516 for PUCCH repetitions that do not meet the specified criteria, etc.

In some examples, the set of rules 522 or the restrictions may be specified in standard specifications and/or preconfigured at a UE. In other examples, the set of rules 522 or the restrictions may be configured/indicated to a UE from a base station, such as via radio resource control (RRC) signaling. For example, as shown at 524, the base station 502 may indicate the set of rules 522 to the first UE 504.

At 526, based on the determination, one or more UEs in the set of UEs may transmit PUCCH repetitions based on the PUCCH repetition factor 516. For example, if the PUCCH repetition factor 516 corresponds to four (4) PUCCH repetitions, and the first UE 504 and the $N^{th}$ UE 508 determine that the PUCCH repetition factor 516 are applicable to them, the first UE 504 and the $N^{th}$ UE 508 may transmit four PUCCH repetitions 528 to the base station 502, such as by using the configured PUCCH resources 512. In another example, if the second UE 506 determines that the PUCCH repetition factor 516 does not apply to its PUCCH repetitions based on the determination, the second UE 506 may skip applying the PUCCH repetition factor 516. For example, the second UE 506 may transmit a PUCCH to the base station 502 without PUCCH repetition(s), or with PUCCH repetition(s) using a repetition number received from a prior configuration, etc.

In another aspect of present disclosure, a base station may indicate a PUCCH repetition factor as a bit string corresponding to an index which indicates one value among multiple preconfigured values for the PUCCH repetition factor. Thus, when a UE receives the PUCCH repetition factor (e.g., the index) from the base station, the UE may determine a number of PUCCH repetitions that corresponds to one of the preconfigure values based on the PUCCH repetition factor. The set of options (e.g., the set of preconfigured values) may be different for different UEs in the set of UEs. In other words, a common indicated index may indicate different PUCCH repetition factors for different UEs in the set of UEs (e.g., UEs that receive the group-common DCI including the PUCCH repetition factor). In addition, the set of preconfigured values may depend on UCI size, a PUCCH format, UCI content, and/or a PUCCH resource set, etc.

Figure 6:
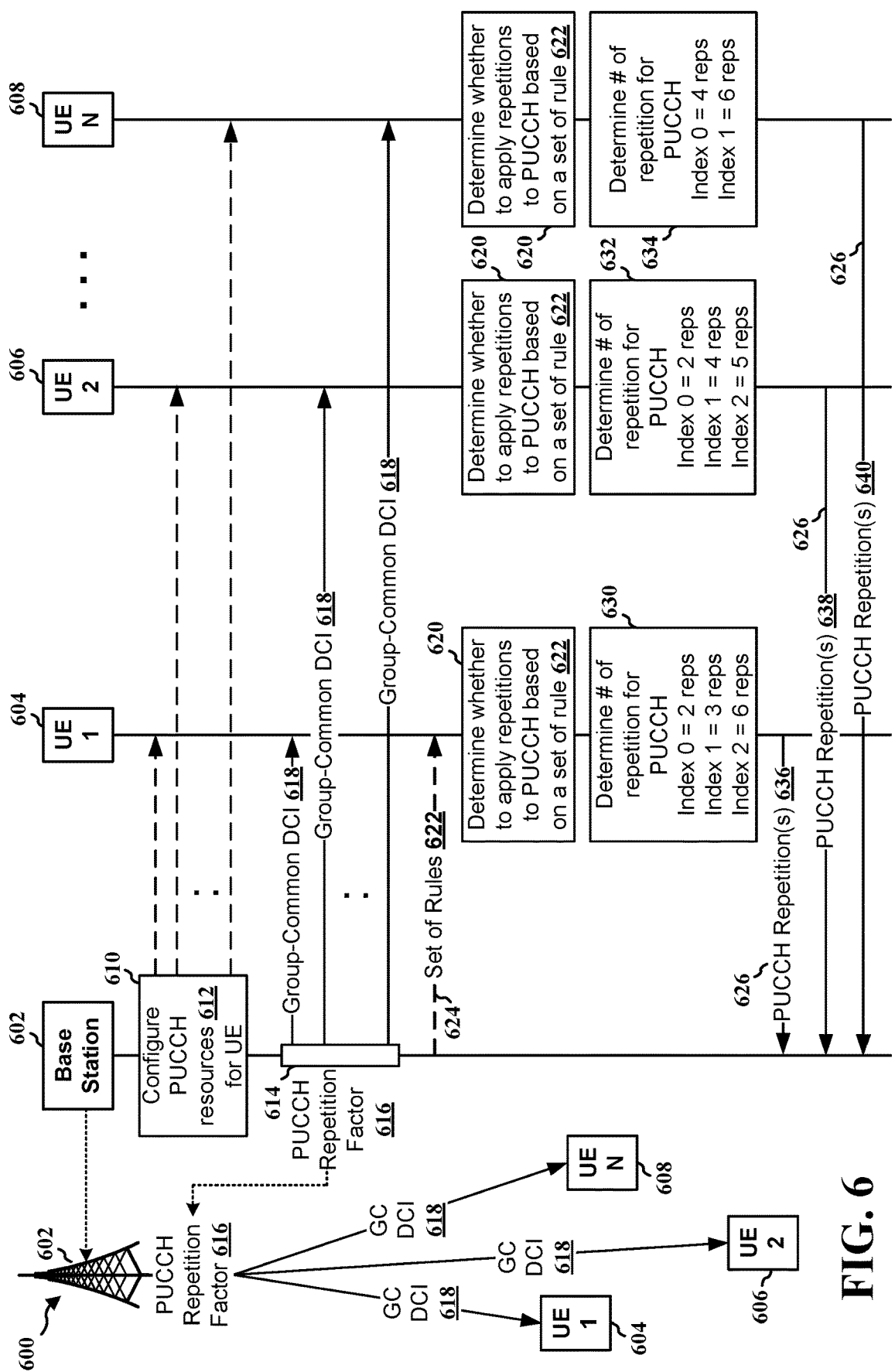
FIG. 6 is a communication flow illustrating an example of a base station indicating a PUCCH repetition factor to multiple UEs using group-common DCI according to aspects of the present disclosure.

FIG. 6 is a communication flow 600 illustrating an example of a base station indicating a PUCCH repetition factor (e.g., an index that corresponds to one of multiple preconfigured values at a UE) to multiple UEs using group-common DCI according to aspects of the present disclosure.

At 610, a base station 602 may configure a set of PUCCH resources 612 for a set of UEs, which may include a first UE 604, a second UE 606, and up to an $N^{th}$ UE 608, etc. One or more UEs within the set of UEs may use the configured PUCCH resources 612 for transmitting a PUCCH and/or PUCCH repetitions.

At 614, the base station 602 may transmit a group-common DCI message 618 to the set of UEs, which may include the first UE 604, the second UE 606, and the $N^{th}$ UE 608, etc. The group-common DCI message 618 may include a PUCCH repetition factor 616 in which one or more UEs in the set of UEs may apply. In one example, the repetition factor may correspond to an index that indicates or corresponds to one of multiple values for the PUCCH repetition factor configured at a UE, where the values may be different for different UEs in the set of UEs.

For example, the PUCCH repetition factor 616 may be a bit string (e.g., 01, 011, etc.) that corresponds to an index value (e.g., zero, one, two, three, etc.). Then, as shown at 630, 632, and 634, a UE may determine a number of PUCCH repetitions to be applied for its PUCCH repetitions based on the index value. For example, as shown at 630, at the first UE 604, a set of values for the PUCCH repetitions may be configured for the first UE 604, where the set of values may indicate that two (2) PUCCH repetitions are to be applied for a PUCCH transmission if the index value is equal to zero (0), three (3) PUCCH repetitions are to be applied for a PUCCH transmission if the index value is equal to one (1), and six (6) PUCCH repetitions are to be applied for a PUCCH transmission if the index is equal to two (2), etc. Similarly, as shown at 632, at the second UE 606, a set of values for the PUCCH repetitions may be configured for the second UE 606, where the set of values may indicate that two (2) PUCCH repetitions are to be applied for a PUCCH transmission if the index value is equal to zero (0), four (4) PUCCH repetitions are to be applied for a PUCCH transmission if the index value is equal to one (1), and five (5) PUCCH repetitions are to be applied for a PUCCH transmission if the index is equal to two (2), etc. As shown at 632, at the $N^{th}$ UE 608, a set of values for the PUCCH repetitions may also be configured for the $N^{th}$ UE 608, where the set of values may indicate that four (2) PUCCH repetitions are to be applied for a PUCCH transmission if the index value is equal to zero (0) and six (6) PUCCH repetitions are to be applied for a PUCCH transmission if the index value is equal to one (1), etc. As such, if the PUCCH repetition factor 616 transmitted from the base station 602 corresponds to index one (1), the first UE 604 may apply three (3) PUCCH repetitions for its PUCCH transmission, the second UE 606 may apply four (4) PUCCH repetitions for its PUCCH transmission, and the $N^{th}$ UE 608 may apply four (4) PUCCH repetitions for its PUCCH transmission, etc. In some examples, the set of preconfigured values at each UE may depend on UCI size, a PUCCH format, UCI content, a PUCCH resource set, or a combination thereof associated with the PUCCH.

In some examples, if a UE receives an index value that does not correspond to a value in the set of values, the UE may skip applying the PUCCH repetition factor 616. For example, if the PUCCH repetition factor 616 transmitted from the base station 602 corresponds to index two (2), the $N^{th}$ UE 608 may skip applying the PUCCH repetition factor 616 as the set of values configured for the $N^{th}$ UE 608 does not include a corresponding PUCCH repetition value for the index two.

Similarly, at 620, after receiving the group-common DCI 618 that includes the PUCCH repetition factor 616 (e.g., the index) from the base station 602, one or more UEs in the set of UEs, such as the first UE 604, the second UE 606, and the $N^{th}$ UE 608, may determine whether to apply the PUCCH repetition factor 616 to their corresponding PUCCH transmissions or whether to update their PUCCH repetition numbers, e.g., if the number of repetitions indicated by the PUCCH repetition factor 616 is different from a currently/previously configured repetition number.

In some examples, a UE (e.g., 604, 606, or 608) may determine whether to apply the PUCCH repetition factor 616 based on a set of rules 622 (e.g., or restrictions) defined at the UE (e.g., through a pre-configuration) or configured for the UE (e.g., by the base station 602). For example, the set of rules 622 may be associated with uplink control information (UCI), where the set of rules 622 may indicate that a UE may apply the PUCCH repetition factor 616 to its PUCCH repetitions (e.g., to transmit X PUCCH repetitions) if the PUCCH and/or the PUCCH repetitions that are to be transmitted by the UE include UCI and/or certain UCI content(s) (e.g., whether the UCI is carrying channel state information (CSI) feedback), and/or the UE may apply the PUCCH repetition factor 616 to its PUCCH repetition if the PUCCH repetitions are carrying UCI that meets a UCI size threshold (e.g., the PUCCH repetitions may apply to PUCCH carrying UCI that is below the UCI size threshold), etc. Thus, the UE may apply the PUCCH repetition factor 616 for PUCCH repetitions that include the UCI or certain UCI content(s), and the UE may skip applying the PUCCH repetition factor 616 for PUCCH repetitions that do not include the UCI or certain UCI content(s), etc.

In another example, the set of rules 622 may be associated with a PUCCH format, where the set of rules 622 may indicate that a UE may apply the PUCCH repetition factor 616 to its PUCCH repetitions (e.g., to transmit X PUCCH repetitions) if the PUCCH and/or the PUCCH repetitions that are to be transmitted by the UE use one or more PUCCH formats defined for the UE. For example, the set of rules 622 may indicate that the UE may apply the PUCCH repetition factor 616 for PUCCH repetitions that are transmitted in a short PUCCH format. Thus, the UE may apply the PUCCH repetition factor 616 for PUCCH repetitions that use the short PUCCH format, and the UE may skip applying the PUCCH repetition factor 616 for PUCCH repetitions that do not use the short PUCCH format, etc.

In another example, the set of rules 622 may be associated with at least one of subcarrier spacing, frequency range, carrier frequency, or a BWP that are used for the PUCCH retransmissions. For example, the set of rules 622 may indicate that the UE may apply the PUCCH repetition factor 616 for PUCCH repetitions that are transmitted using a specified subcarrier spacing, using a specified frequency range, using a specified carrier frequency, using a specified BWP, or a combination thereof. Thus, the UE may apply the PUCCH repetition factor 616 for PUCCH repetitions that meet the specified criteria, and the UE may skip applying the PUCCH repetition factor 616 for PUCCH repetitions that do not meet the specified criteria, etc.

In some examples, the set of rules 622 or the restrictions may be specified in standard specifications and preconfigured at a UE. In other examples, the set of rules 622 or the restrictions may be configured/indicated to a UE from a base station, such as via RRC signaling. For example, as shown at 624, the base station 602 may indicate the set of rules 622 to the first UE 604.

At 626, based on the determination, one or more UEs in the set of UEs may transmit PUCCH repetitions based on the PUCCH repetition factor 616. For example, if the PUCCH repetition factor 616 corresponds to index one (1) and the first UE 604, the second UE 606, and the N$^{th}$ UE 608 determine that the PUCCH repetition factor 616 is applicable to them, the first UE 604 may transmit three PUCCH repetitions 636 to the base station 602, the second UE 606 may transmit four PUCCH repetitions 638 to the base station 602, and the N$^{th}$ UE 608 may transmit four PUCCH repetitions 640 to the base station 602, etc. The transmission of the PUCCH repetitions (e.g., 636, 638 and 640) may be based on the configured PUCCH resources 612. On the other hand, if a UE determines that the PUCCH repetition factor 616 does not apply to its PUCCH repetitions based on the determination, the UE may skip applying the PUCCH repetition factor 616. For example, the UE may transmit a PUCCH to the base station 602 without PUCCH repetition(s), or with PUCCH repetition(s) using a repetition number based on a current/prior configuration, etc.

In some examples, a base station may determine whether to transmit the PUCCH repetition factor (e.g., 516, 616) to a set of UEs and/or the base station may determine the value for repetitions (e.g., the integer X in FIG. 5) or the value for the index (e.g., in FIG. 6) associated with the PUCCH repetition factor based at least in part on the channel quality (e.g., for the uplink channel and/or the downlink channel). For example, the base station may determine a channel quality for at least one uplink channel and/or at least one downlink channel associated with each UE in the set of UEs. Then, based on the channel quality for the at least one uplink/downlink channel, the base station may determine whether to transmit the PUCCH repetition factor via group-common DCI to a set of UEs, and/or the repetition number/index associated with the PUCCH repetition factor. The channel quality may be determined based on channel measurement feedback received from at least one UE of the set of UEs, and/or based on a channel history of at least one of the at least one uplink channel, etc. For example, when the base station detects that the channel quality for one or more uplink channels and/or downlink channels is below a threshold, the base station may determine to indicate the PUCCH repetition factor to a set of UEs to improve the communication reliability, and/or the base station may indicate a PUCCH repetition factor that corresponds to a higher number of PUCCH repetitions (e.g., more PUCCH repetitions). For example, the integer X described in connection with FIG. 5 may be configured to be a larger value when the channel quality is below a threshold, or the index value described in connection with FIG. 6 may correspond to a higher repetition number for one or more UEs when the channel quality is below a threshold, etc.

Figure 7:
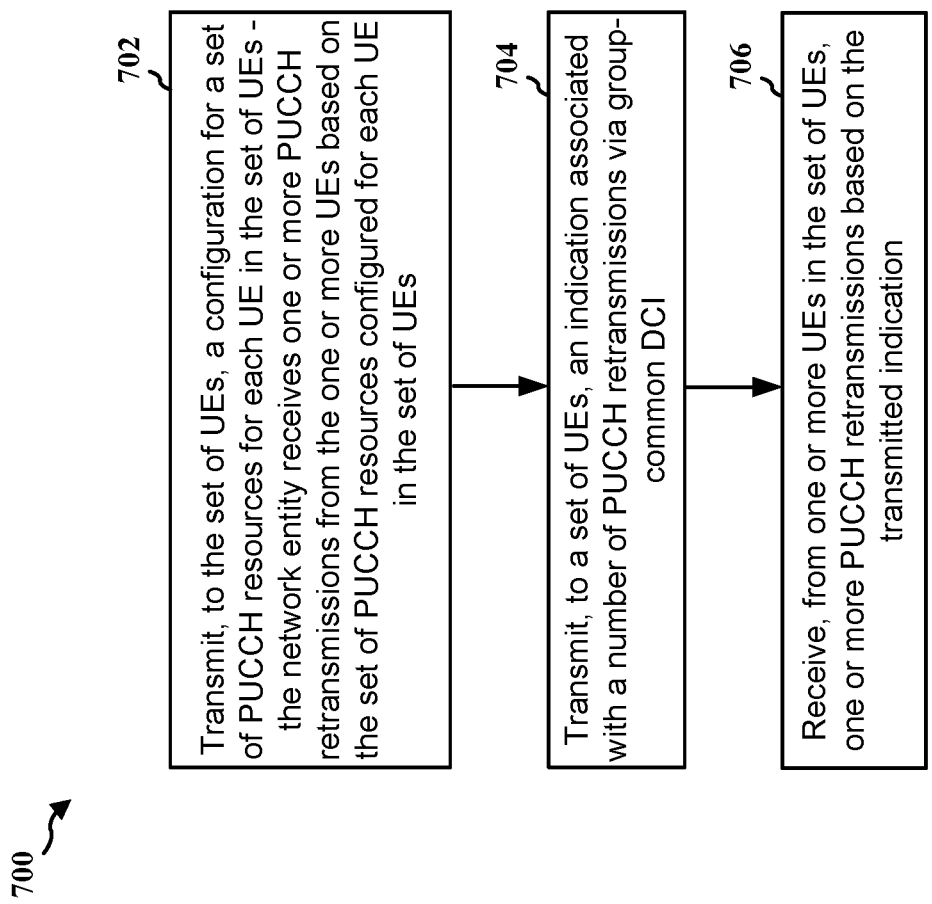
FIG. 7 is a flowchart of a method of wireless communication in accordance with aspects presented herein.

FIG. 7 is a flowchart 700 of a method of wireless communication. The method may be performed by a network entity or a component of a network entity (e.g., the base station 102, 180, 310, 404, 502, 602; the apparatus 902; a processing system, which may include the memory 376 and which may be the entire base station 310 or a component of the base station 310, such as the TX processor 316 the RX processor 370, and/or the controller/processor 375). The method may enable the base station to indicate a PUCCH repetition factor to a set of UEs via group-common DCI.

At 702, the network entity may transmit, to a set of UEs, a configuration for a set of PUCCH resources for each UE in the set of UEs, where the network entity may receive one or more PUCCH retransmissions from one or more UEs in the set of UEs based on the set of PUCCH resources configured for each UE in the set of UEs, such as described in connection with FIGS. 5 and 6. For example, at 510, the base station 502 may configure PUCCH resources 512 for the first UE 504, the second UE 506 and up to the N$^{th}$ UE 508. The transmission of the configuration for the set of PUCCH resources may be performed, e.g., by the PUCCH resource configuration component 940 and/or the transmission component 934 of the apparatus 902 in FIG. 9.

At 704, the network entity may transmit, to a set of UEs, an indication associated with a number of PUCCH retransmissions via group-common DCI, such as described in connection with FIGS. 5 and 6. For example, at 514, the base station 502 may transmit a PUCCH repetition factor 516 in a group common DCI message 518 to the first UE 504, the second UE 506 and up to the Nth UE 508. The transmission of the indication associated with a number of PUCCH retransmissions may be performed, e.g., by the PUCCH repetition configuration component 942 and/or the transmission component 934 of the apparatus 902 in FIG. 9.

In one example, as described in connection with FIG. 5, the indication may correspond to an integer N associated with the one or more PUCCH retransmissions, such that the network entity may receive N PUCCH retransmissions or N-1 PUCCH retransmissions from each of the one or more UEs.

In another example, as described in connection with FIG. 6, the indication may be an index that corresponds to one of multiple configured values for PUCCH retransmissions at each of the one or more UEs, and the network entity may receive, from each of the one or more UEs, a configured value of PUCCH retransmissions based on the index. For example, the configured values of PUCCH retransmissions for at least two of the one or more UEs may be different.

In some examples, the network entity may determine a channel quality for at least one uplink channel associated with each UE in the set of UEs, and then the network entity may determine, based on the channel quality for the at least one uplink channel, a value for the index. In such an example, the channel quality may be determined based on channel measurement feedback received from at least one UE of the set of UEs, and/or a channel history of at least one of the at least one uplink channel, etc.

In another example, as described in connection with 520 of FIG. 5 and/or 620 of FIG. 6, the indication may apply to PUCCH retransmissions that include UCI or specified UCI content(s), such as PUCCH retransmissions that include UCI carrying CSI feedback. In another example, the indication may apply to PUCCH retransmissions using one or more PUCCH formats, such as to PUCCH retransmissions using a short PUCCH format of the one or more PUCCH formats. In another example, the indication may apply to PUCCH retransmissions based on at least one of subcarrier spacing, frequency range, carrier frequency, or a BWP associated with the PUCCH retransmissions.

In another example, as described in connection with 524 of FIG. 5 and/or 624 of FIG. 6, the network entity may configure a restriction (e.g., a set of rules 522/622) for each UE in the set of UEs for each UE to determine whether to transmit PUCCH retransmissions based on the indication, where the restriction may be configured for each UE in the set of UEs via RRC signaling. Similarly, the restriction may be associated with UCI, associated with one or more PUCCH formats for the PUCCH retransmissions, and/or associated with at least one of subcarrier spacing, frequency range, carrier frequency, or a BWP for the PUCCH retransmissions, etc.

At 706, the network entity may receive, from one or more UEs in the set of UEs, one or more PUCCH retransmissions based on the transmitted indication, such as described in connection with FIGS. 5 and 6. For example, at 526, the base station 502 may receive PUCCH retransmissions based on the transmitted PUCCH repetition factor 516 from at least the first UE 504 and the Nth UE 508. The reception of the PUCCH repetitions may be performed, e.g., by the PUCCH repetition reception component 944 and/or the reception component 930 of the apparatus 902 in FIG. 9.

Figure 8:
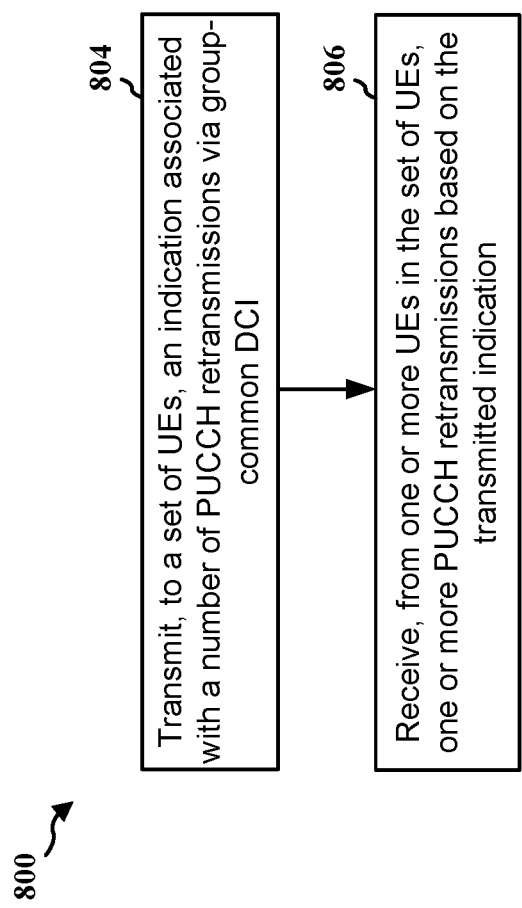
FIG. 8 is a flowchart of a method of wireless communication in accordance with aspects presented herein.

FIG. 8 is a flowchart 800 of a method of wireless communication. The method may be performed by a network entity or a component of a network entity (e.g., the base station 102, 180, 310, 404, 502, 602; the apparatus 902; a processing system, which may include the memory 376 and which may be the entire base station 310 or a component of the base station 310, such as the TX processor 316 the RX processor 370, and/or the controller/processor 375). The method may enable the network entity to indicate a PUCCH repetition factor to a set of UEs via group-common DCI. In some examples, the network entity may be a RAN/base station, or one or more component of a RAN/base station (e.g., a CU, one or more DUs, one or more Rus, one or more TRPs, one or more relays, one or more intelligent reflective surfaces, and/or a combination thereof).

At 804, the network entity may transmit, to a set of UEs, an indication associated with a number of PUCCH retransmissions via group-common DCI, such as described in connection with FIGS. 5 and 6. For example, at 514, the base station 502 may transmit a PUCCH repetition factor 516 in a group common DCI message 518 to the first UE 504, the second UE 506 and up to the Nth UE 508. The transmission of the indication associated with a number of PUCCH retransmissions may be performed, e.g., by the PUCCH repetition configuration component 942 and/or the transmission component 934 of the apparatus 902 in FIG. 9.

In one example, the network entity may transmit, to a set of UEs, a configuration for a set of PUCCH resources for each UE in the set of UEs, where the network entity may receive one or more PUCCH retransmissions from one or more UEs in the set of UEs based on the set of PUCCH resources configured for each UE in the set of UEs, such as described in connection with FIGS. 5 and 6. For example, at 510, the base station 502 may configure PUCCH resources 512 for the first UE 504, the second UE 506 and up to the $N^{th}$ UE 508. The transmission of the configuration for the set of PUCCH resources may be performed, e.g., by the PUCCH resource configuration component 940 and/or transmission component 934 of the apparatus 902 in FIG. 9.

In another example, as described in connection with FIG. 5, the indication may correspond to an integer N associated with the one or more PUCCH retransmissions, such that the network entity may receive N PUCCH retransmissions or N−1 PUCCH retransmissions from each of the one or more UEs.

In another example, as described in connection with FIG. 6, the indication may be an index that corresponds to one of multiple configured values for PUCCH retransmissions at each of the one or more UEs, and the network entity may receive, from each of the one or more UEs, a configured value of PUCCH retransmissions based on the index. For example, the configured values of PUCCH retransmissions for at least two of the one or more UEs may be different.

In some examples, the network entity may determine a channel quality for at least one uplink channel associated with each UE in the set of UEs, and then the network entity may determine, based on the channel quality for the at least one uplink channel, a value for the index. In such an example, the channel quality may be determined based on channel measurement feedback received from at least one UE of the set of UEs, and/or a channel history of at least one of the at least one uplink channel, etc.

In another example, as described in connection with 520 of FIG. 5 and/or 620 of FIG. 6, the indication may apply to PUCCH retransmissions that include UCI or specified UCI content(s), such as PUCCH retransmissions that include UCI carrying CSI feedback. In another example, the indication may apply to PUCCH retransmissions using one or more PUCCH formats, such as to PUCCH retransmissions using a short PUCCH format of the one or more PUCCH formats. In another example, the indication may apply to PUCCH retransmissions based on at least one of subcarrier spacing, frequency range, carrier frequency, or a BWP associated with the PUCCH retransmissions.

In another example, as described in connection with 524 of FIG. 5 and/or 624 of FIG. 6, the network entity may configure a restriction (e.g., a set of rules 522/622) for each UE in the set of UEs for each UE to determine whether to transmit PUCCH retransmissions based on the indication, where the restriction may be configured for each UE in the set of UEs via RRC signaling. Similarly, the restriction may be associated with UCI, associated with one or more PUCCH formats for the PUCCH retransmissions, and/or associated with at least one of subcarrier spacing, frequency range, carrier frequency, or a BWP for the PUCCH retransmissions, etc.

At 806, the network entity may receive, from one or more UEs in the set of UEs, one or more PUCCH retransmissions based on the transmitted indication, such as described in connection with FIGS. 5 and 6. For example, at 526, the base station 502 may receive PUCCH retransmissions based on the transmitted PUCCH repetition factor 516 from at least the first UE 504 and the Nth UE 508. The reception of the PUCCH repetitions may be performed, e.g., by the PUCCH repetition reception component 944 and/or the reception component 930 of the apparatus 902 in FIG. 9.

Figure 9:
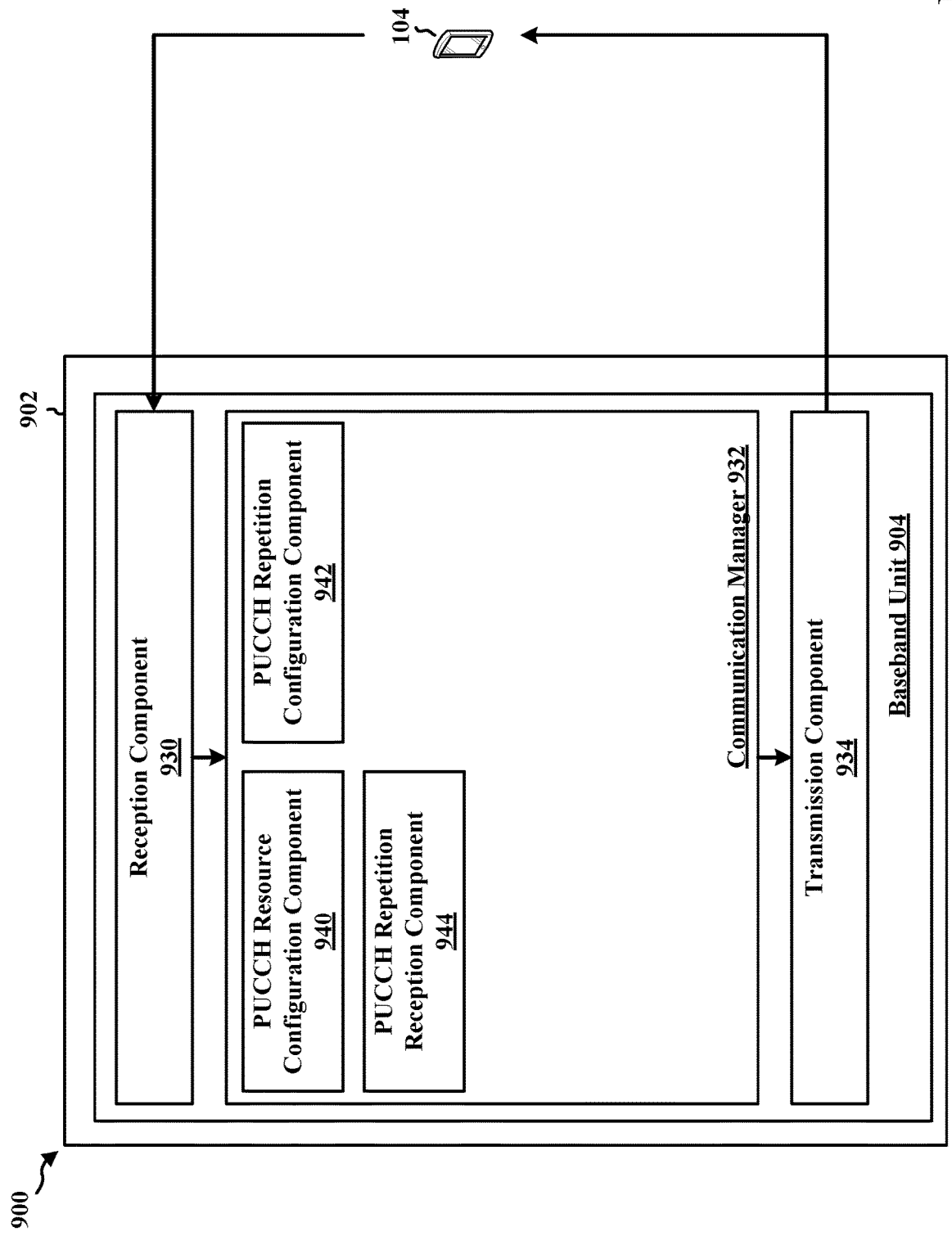
FIG. 9 is a diagram illustrating an example of a hardware implementation for an example apparatus in accordance with aspects presented herein.

FIG. 9 is a diagram 900 illustrating an example of a hardware implementation for an apparatus 902. The apparatus 902 is a network entity and includes a baseband unit 904. The baseband unit 904 may communicate through a cellular RF transceiver with the UE 104. The baseband unit 904 may include a computer-readable medium/memory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband unit 904. The baseband unit 904 may be a component of the BS 310 and may include the memory 376 and/or at least one of the TX processor 316, the RX processor 370, and the controller/processor 375.

The communication manager 932 includes a PUCCH resource configuration component 940 that is configured to transmit, to the set of UEs, a configuration for a set of PUCCH resources for each UE in the set of UEs, where the network entity receives the one or more PUCCH retransmissions from the one or more UEs based on the set of PUCCH resources configured for each UE in the set of UEs, e.g., as described in connection with 702 of FIG. 7. The communication manager 932 further includes a PUCCH repetition configuration component 942 that is configured to transmit, to a set of UEs, an indication associated with a number of PUCCH retransmissions via group-common DCI, e.g., as described in connection with 704 of FIG. 7 and/or 804 of FIG. 8. The communication manager 932 further includes a PUCCH repetition reception component 944 that is configured to receive, from one or more UEs in the set of UEs, one or more PUCCH retransmissions based on the transmitted indication, e.g., as described in connection with 706 of FIG. 7 and/or 806 of FIG. 8.

The apparatus may include additional components that perform each of the blocks of the algorithm in the flowcharts of FIGS. 7 and 8. As such, each block in the flowcharts of FIGS. 7 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the baseband unit 904, includes means for transmitting, to the set of UEs, a configuration for a set of PUCCH resources for each UE in the set of UEs, where the network entity receives the one or more PUCCH retransmissions from the one or more UEs based on the set of PUCCH resources configured for each UE in the set of UEs (e.g., the PUCCH resource configuration component 940 and/or the transmission component 934). The apparatus 902 includes means for transmitting, to a set of UEs, an indication associated with a number of PUCCH retransmissions via group-common DCI (e.g., the PUCCH repetition configuration component 942 and/or the transmission component 934). The apparatus 902 includes means for receiving, from one or more UEs in the set of UEs, one or more PUCCH retransmissions based on the transmitted indication (e.g., the PUCCH repetition reception component 944 and/or the reception component 930).

In one configuration, the indication may correspond to an integer N associated with the one or more PUCCH retransmissions, such that the network entity may receive N PUCCH retransmissions or N−1 PUCCH retransmissions from each of the one or more UEs.

In another configuration, the indication may be an index that corresponds to one of multiple configured values for PUCCH retransmissions at each of the one or more UEs, and the network entity may receive, from each of the one or more UEs, a configured value of PUCCH retransmissions based on the index. In such configuration, the configured values of PUCCH retransmissions for at least two of the one or more UEs may be different.

In one configuration, the apparatus 902 includes means for determining a channel quality for at least one uplink channel associated with each UE in the set of UEs, and means for determining, based on the channel quality for the at least one uplink channel, a value for the index. In such configuration, the channel quality may be determined based on channel measurement feedback received from at least one UE of the set of UEs, and/or a channel history of at least one of the at least one uplink channel, etc.

In another configuration, the indication may apply to PUCCH retransmissions that include UCI or specified UCI content, such as PUCCH retransmissions that include UCI carrying CSI feedback. In another configuration, the indication may apply to PUCCH retransmissions using one or more PUCCH formats, such as to PUCCH retransmissions using a short PUCCH format of the one or more PUCCH formats. In another configuration, the indication may apply to PUCCH retransmissions based on at least one of subcarrier spacing, frequency range, carrier frequency, or a BWP associated with the PUCCH retransmissions.

In another configuration, the apparatus 902 includes means for configuring a restriction for each UE in the set of UEs for each UE to determine whether to transmit PUCCH retransmissions based on the indication, where the restriction may be configured for each UE of the set of UEs via RRC signaling. In such configuration, the restriction may be associated with UCI, associated with one or more PUCCH formats for the PUCCH retransmissions, and/or associated with at least one of subcarrier spacing, frequency range, carrier frequency, or a BWP for the PUCCH retransmissions, etc.

The means may be one or more of the components of the apparatus 902 configured to perform the functions recited by the means. As described supra, the apparatus 902 may include the TX Processor 316, the RX Processor 370, and the controller/processor 375. As such, in one configuration, the means may be the TX Processor 316, the RX Processor 370, and the controller/processor 375 configured to perform the functions recited by the means.

Figure 10:
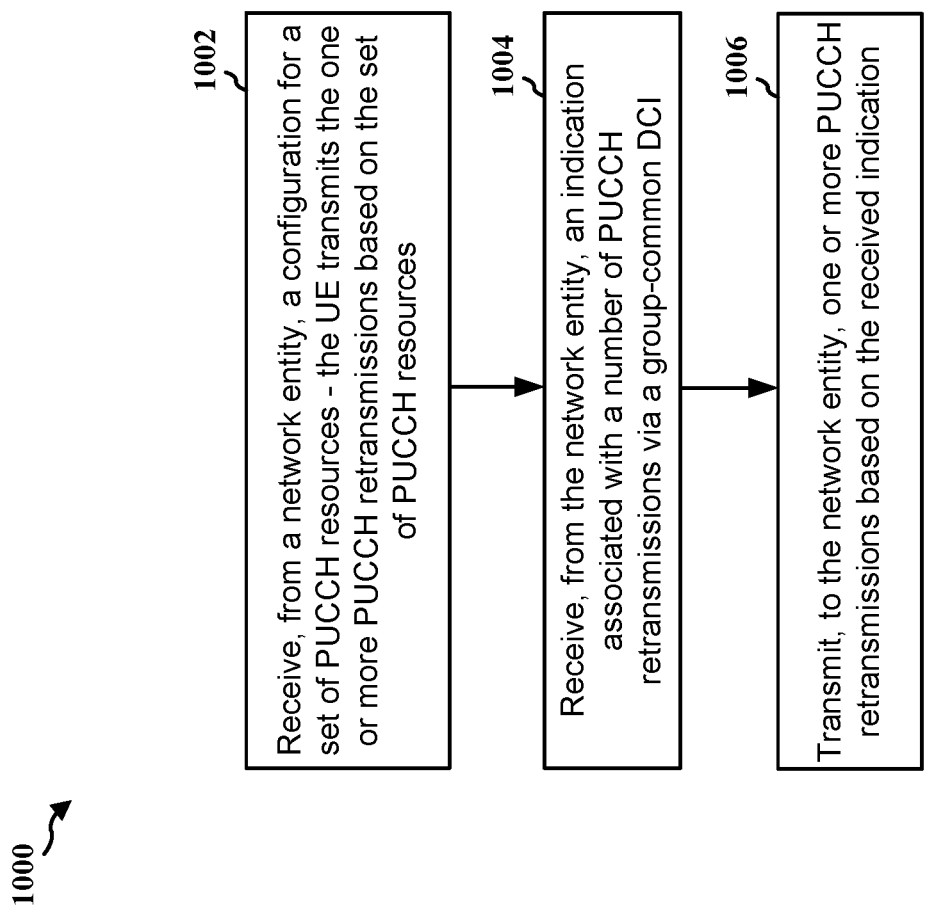
FIG. 10 is a flowchart of a method of wireless communication in accordance with aspects presented herein.

FIG. 10 is a flowchart 1000 of a method of wireless communication. The method may be performed by a UE or a component of a UE (e.g., the UE 104, 350, 402, 504, 506, 508, 604, 606, 608; the apparatus 1202; a processing system, which may include the memory 360 and which may be the entire UE 350 or a component of the UE 350, such as the TX processor 368, the RX processor 356, and/or the controller/processor 359). The method may enable the UE to determine a number of PUCCH repetitions to be applied for a PUCCH transmission based on a PUCCH repetition factor received from a network entity via group-common DCI.

At 1002, the UE may receive, from the network entity, a configuration for a set of PUCCH resources, where the UE transmits the one or more PUCCH retransmissions based on the set of PUCCH resources, such as described in connection with FIGS. 5 and 6. For example, at 510, the first UE 504 may receive a configuration for the PUCCH resources 512 from the base station 502. The reception of the PUCCH resource configuration may be performed, e.g., by the PUCCH resource process component 1240 and/or the reception component 1230 of the apparatus 1202 in FIG. 12.

At 1004, the UE may receive, from a network entity, an indication associated with a number of PUCCH retransmissions via a group-common DCI, such as described in connection with FIGS. 5 and 6. For example, at 514, the first UE 504 may receive a PUCCH repetition factor 516 in a group-common DCI message 518 from the base station 502. The reception of the indication associated with the number of PUCCH retransmissions may be performed, e.g., by the PUCCH repetition configuration component 1242 and/or the reception component 1230 of the apparatus 1202 in FIG. 12.

In one example, as described in connection with FIG. 5, the indication may correspond to an integer N associated with the one or more PUCCH retransmissions, such that the UE transmits N PUCCH retransmissions or N−1 PUCCH retransmissions to the network entity.

In another example, as described in connection with FIG. 6, the indication may be an index that corresponds to one of multiple configured values for PUCCH retransmissions at the UE, and the UE may transmit a configured value of PUCCH retransmissions based on the index. In such an example, the multiple configured values for PUCCH retransmissions may be determined based on at least one of: UCI size, PUCCH format, UCI content, or PUCCH resource set, etc.

In another example, as described in connection with 520/620 of FIGS. 5 and 6, the UE may determine whether to apply PUCCH retransmissions. For example, the determination whether to apply PUCCH retransmissions may be based on whether the PUCCH retransmissions include UCI or UCI carrying CSI feedback, may be based on a PUCCH format for the PUCCH retransmissions, and/or may be based on at least one of subcarrier spacing, frequency range, carrier frequency, or a BWP associated with the PUCCH retransmissions, etc.

In one example, the determination whether to apply PUCCH retransmissions may be based on a restriction configured by the network entity. In such an example, the restriction may be configured by the network entity via RRC signaling, such as shown at 524/624 of FIGS. 5 and 6. In such an example, the restriction may be associated with UCI, may be associated with one or more PUCCH formats for the PUCCH retransmission, and/or may be associated with at least one of subcarrier spacing, frequency range, carrier frequency, or a BWP for the PUCCH retransmissions, etc.

At 1006, the UE may transmit, to the network entity, one or more PUCCH retransmissions based on the received indication, such as described in connection with FIGS. 5 and 6. For example, at 526, the first UE 504 may transmit PUCCH repetition(s) 528 to the base station 502 based on the PUCCH repetition factor 516. The transmission of the PUCCH repetition(s) may be performed, e.g., by the PUCCH repetition transmission component 1244 and/or the transmission component 1234 of the apparatus 1202 in FIG. 12.

Figure 11:
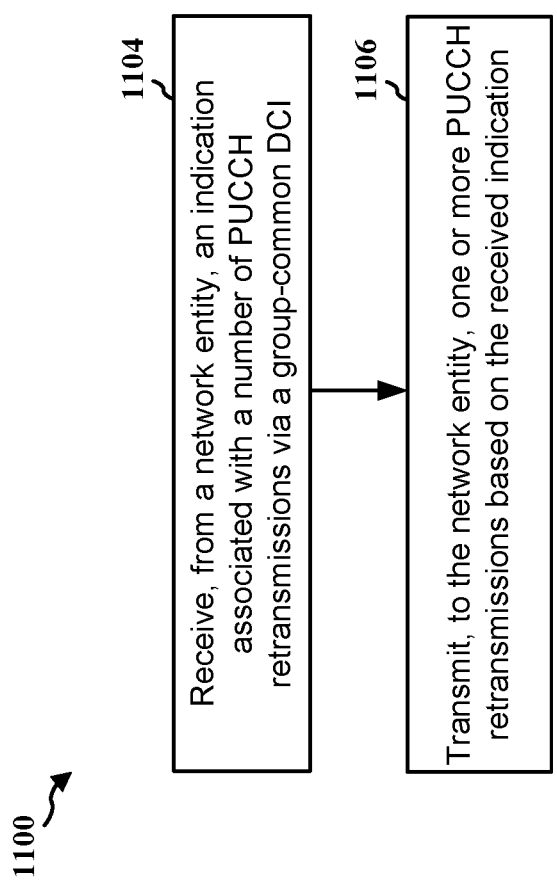
FIG. 11 is a flowchart of a method of wireless communication in accordance with aspects presented herein.

FIG. 11 is a flowchart 1100 of a method of wireless communication. The method may be performed by a UE or a component of a UE (e.g., the UE 104, 350, 402, 504, 506, 508, 604, 606, 608; the apparatus 1202; a processing system, which may include the memory 360 and which may be the entire UE 350 or a component of the UE 350, such as the TX processor 368, the RX processor 356, and/or the controller/processor 359). The method may enable the UE to determine a number of PUCCH repetitions to be applied for a PUCCH transmission based on a PUCCH repetition factor received from a network entity via group-common DCI.

At 1104, the UE may receive, from a network entity, an indication associated with a number of PUCCH retransmissions via a group-common DCI, such as described in connection with FIGS. 5 and 6. For example, at 514, the first UE 504 may receive a PUCCH repetition factor 516 in a group-common DCI message 518 from the base station 502. The reception of the indication associated with the number of PUCCH retransmissions may be performed, e.g., by the PUCCH repetition configuration component 1242 and/or the reception component 1230 of the apparatus 1202 in FIG. 12.

In one example, the UE may receive, from the network entity, a configuration for a set of PUCCH resources, where the UE transmits the one or more PUCCH retransmissions based on the set of PUCCH resources, such as described in connection with FIGS. 5 and 6. For example, at 510, the first UE 504 may receive a configuration for the PUCCH resources 512 from the base station 502. The reception of the PUCCH resource configuration may be performed, e.g., by the PUCCH resource process component 1240 and/or the reception component 1230 of the apparatus 1202 in FIG. 12.

In another example, as described in connection with FIG. 5, the indication may correspond to an integer N associated with the one or more PUCCH retransmissions, such that the UE transmits N PUCCH retransmissions or N−1 PUCCH retransmissions to the network entity.

In another example, as described in connection with FIG. 6, the indication may be an index that corresponds to one of multiple configured values for PUCCH retransmissions at the UE, and the UE may transmit a configured value of PUCCH retransmissions based on the index. In such an example, the multiple configured values for PUCCH retransmissions may be determined based on at least one of: UCI size, PUCCH format, UCI content, or PUCCH resource set, etc.

In another example, as described in connection with 520/620 of FIGS. 5 and 6, the UE may determine whether to apply PUCCH retransmissions. For example, the determination whether to apply PUCCH retransmissions may be based on whether the PUCCH retransmissions include UCI or UCI carrying CSI feedback, may be based on a PUCCH format for the PUCCH retransmissions, and/or may be based on at least one of subcarrier spacing, frequency range, carrier frequency, or a BWP associated with the PUCCH retransmissions, etc.

In one example, the determination whether to apply PUCCH retransmissions may be based on a restriction configured by the network entity. In such an example, the restriction may be configured by the network entity via RRC signaling, such as shown at 524/624 of FIGS. 5 and 6. In such an example, the restriction may be associated with UCI, may be associated with one or more PUCCH formats for the PUCCH retransmission, and/or may be associated with at least one of subcarrier spacing, frequency range, carrier frequency, or a BWP for the PUCCH retransmissions, etc.

At 1106, the UE may transmit, to the network entity, one or more PUCCH retransmissions based on the received indication, such as described in connection with FIGS. 5 and 6. For example, at 526, the first UE 504 may transmit PUCCH repetition(s) 528 to the base station 502 based on the PUCCH repetition factor 516. The transmission of the PUCCH repetition(s) may be performed, e.g., by the PUCCH repetition transmission component 1244 and/or the transmission component 1234 of the apparatus 1202 in FIG. 12.

Figure 12:
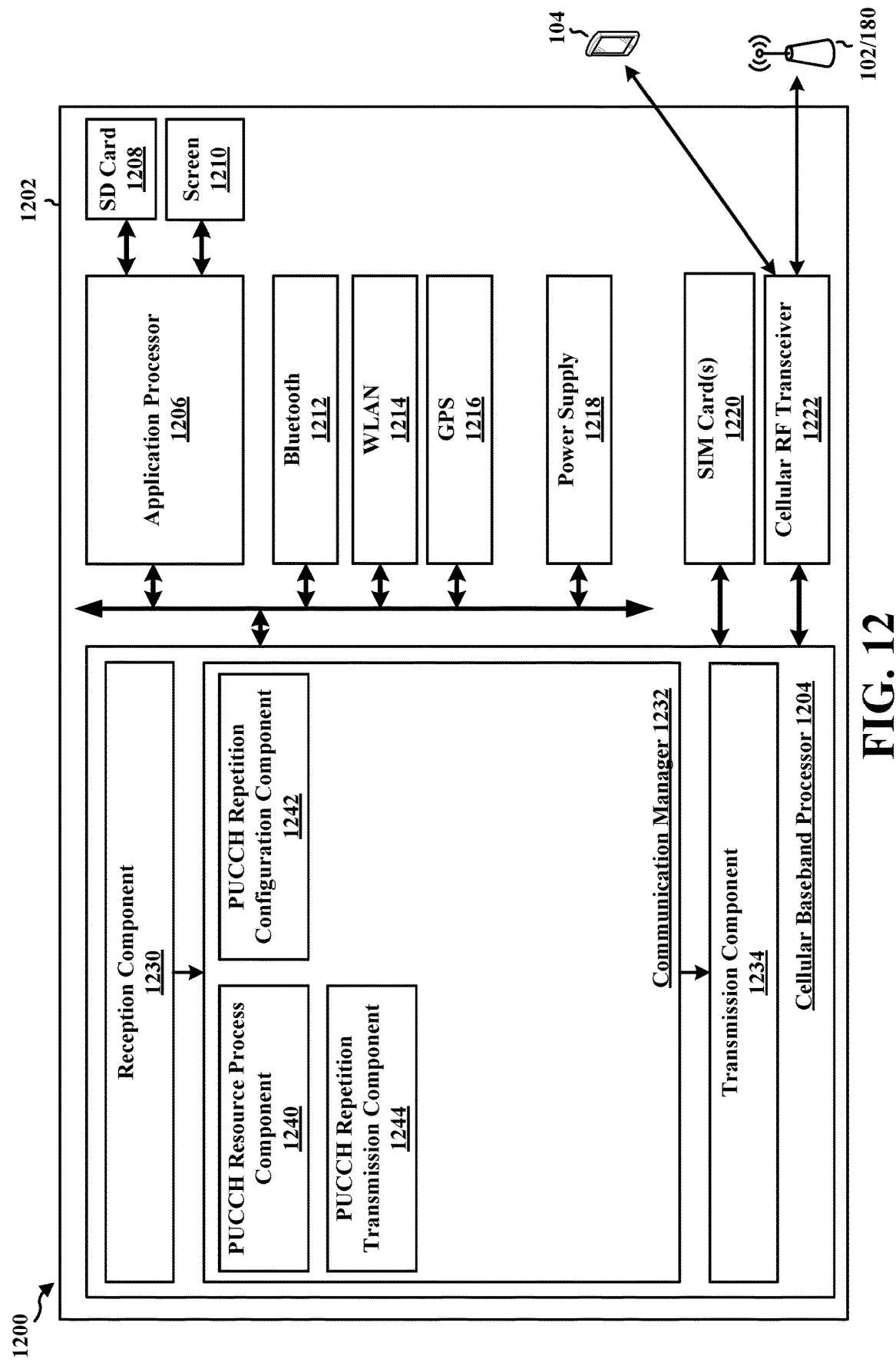
FIG. 12 is a diagram illustrating an example of a hardware implementation for an example apparatus in accordance with aspects presented herein.

FIG. 12 is a diagram 1200 illustrating an example of a hardware implementation for an apparatus 1202. The apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the additional modules of the apparatus 1202.

The communication manager 1232 includes a PUCCH resource process component 1240 that is configured to receive, from the network entity, a configuration for a set of PUCCH resources, where the UE transmits the one or more PUCCH retransmissions based on the set of PUCCH resources, e.g., as described in connection with 1002 of FIG. 10. The communication manager 1232 further includes a PUCCH repetition configuration component 1242 that is configured to receive, from a network entity, an indication associated with a number of PUCCH retransmissions via a group-common DCI, e.g., as described in connection with 1004 of FIG. 10 and/or 1104 of FIG. 11. The communication manager 1232 further includes a PUCCH repetition transmission component 1244 that is configured to transmit, to the network entity, one or more PUCCH retransmissions based on the received indication, e.g., as described in connection with 1006 of FIG. 10 and/or 1106 of FIG. 11.

The apparatus may include additional components that perform each of the blocks of the algorithm in the flowcharts of FIGS. 10 and 11. As such, each block in the flowcharts of FIGS. 10 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204, includes means for receiving, from the network entity, a configuration for a set of PUCCH resources, where the UE transmits the one or more PUCCH retransmissions based on the set of PUCCH resources (e.g., the PUCCH resource process component 1240 and/or the reception component 1230). The apparatus 1202 includes means for receiving, from a network entity, an indication associated with a number of PUCCH retransmissions via a group-common DCI (e.g., the PUCCH repetition configuration component 1242 and/or the reception component 1230). The apparatus 1202 includes means for transmitting, to the network entity, one or more PUCCH retransmissions based on the received indication (e.g., the PUCCH repetition transmission component 1244 and/or the transmission component 1234).

In one configuration, the indication may correspond to an integer N associated with the one or more PUCCH retransmissions, such that the UE transmits N PUCCH retransmissions or N-1 PUCCH retransmissions to the network entity.

In another configuration, the indication may be an index that corresponds to one of multiple configured values for PUCCH retransmissions at the UE, and the UE may transmit a configured value of PUCCH retransmissions based on the index. In such configuration, the multiple configured values for PUCCH retransmissions may be determined based on at least one of: UCI size, PUCCH format, UCI content, or PUCCH resource set, etc.

In another configuration, the apparatus 1202 includes means for determining whether to apply PUCCH retransmissions. In such configuration, the determination whether to apply PUCCH retransmissions may be based on whether the PUCCH retransmissions include UCI or UCI carrying CSI feedback, may be based on a PUCCH format for the PUCCH retransmissions, and/or may be based on at least one of subcarrier spacing, frequency range, carrier frequency, or a BWP associated with the PUCCH retransmissions, etc.

In another configuration, the determination whether to apply PUCCH retransmissions may be based on a restriction configured by the network entity. In such configuration, the restriction may be configured by the network entity via RRC signaling. In such configuration, the restriction may be associated with UCI, may be associated with one or more PUCCH formats for the PUCCH retransmission, and/or may be associated with at least one of subcarrier spacing, frequency range, carrier frequency, or a BWP for the PUCCH retransmissions, etc.

The means may be one or more of the components of the apparatus 1202 configured to perform the functions recited by the means. As described supra, the apparatus 1202 may include the TX Processor 368, the RX Processor 356, and the controller/processor 359. As such, in one configuration, the means may be the TX Processor 368, the RX Processor 356, and the controller/processor 359 configured to perform the functions recited by the means.

The following examples set forth additional aspects and are illustrative only and aspects thereof may be combined with aspects of other embodiments or teaching described herein, without limitation.

Aspect 1 is a method of wireless communication at a network entity, including: transmitting, to a set of UEs, an indication associated with a number of PUCCH retransmissions via group-common DCI; and receiving, from one or more UEs in the set of UEs, one or more PUCCH retransmissions based on the transmitted indication.

In aspect 2, the method of aspect 1 further includes: transmitting, to the set of UEs, a configuration for a set of PUCCH resources for each UE in the set of UEs, where the network entity receives the one or more PUCCH retransmissions from the one or more UEs based on the set of PUCCH resources configured for each UE in the set of UEs.

In aspect 3, the method of aspect 1 or aspect 2 further includes that the indication corresponds to an integer N associated with the one or more PUCCH retransmissions, such that the network entity receives N PUCCH retransmissions or N-1 PUCCH retransmissions from each of the one or more UEs.

In aspect 4, the method of any of aspects 1-3 further includes that the indication is an index that corresponds to one of multiple configured values for PUCCH retransmissions at each of the one or more UEs, and the network entity receives, from each of the one or more UEs, a configured value of PUCCH retransmissions based on the index.

In aspect 5, the method of any of aspects 1-4 further includes that the configured values of PUCCH retransmissions for at least two of the one or more UEs are different.

In aspect 6, the method of any of aspects 1-5 further includes: determining a channel quality for at least one uplink channel associated with each UE in the set of UEs; and determining, based on the channel quality for the at least one uplink channel, a value for the index.

In aspect 7, the method of any of aspects 1-6 further includes that the channel quality is determined based on channel measurement feedback received from at least one UE of the set of UEs.

In aspect 8, the method of any of aspects 1-7 further includes that the channel quality is determined based on a channel history of at least one of the at least one uplink channel.

In aspect 9, the method of any of aspects 1-8 further includes that the indication applies to PUCCH retransmissions that include UCI.

In aspect 10, the method of any of aspects 1-9 further includes that the indication applies to PUCCH retransmissions that include UCI carrying CSI feedback.

In aspect 11, the method of any of aspects 1-10 further includes that the indication applies to PUCCH retransmissions using one or more PUCCH formats.

In aspect 12, the method of any of aspects 1-11 further includes that the indication applies to PUCCH retransmissions using a short PUCCH format of the one or more PUCCH formats.

In aspect 13, the method of any of aspects 1-12 further includes that the indication applies to PUCCH retransmissions based on at least one of subcarrier spacing, frequency range, carrier frequency, or a BWP associated with the PUCCH retransmissions.

In aspect 14, the method of any of aspects 1-13 further includes: configuring a restriction for each UE in the set of UEs for each UE to determine whether to transmit PUCCH retransmissions based on the indication.

In aspect 15, the method of any of aspects 1-14 further includes that the restriction is configured for each UE of the set of UEs via RRC signaling.

In aspect 16, the method of any of aspects 1-15 further includes that the restriction is associated with UCI.

In aspect 17, the method of any of aspects 1-16 further includes that the restriction is associated with one or more PUCCH formats for the PUCCH retransmissions.

In aspect 18, the method of any of aspects 1-17 further includes that the restriction is associated with at least one of subcarrier spacing, frequency range, carrier frequency, or a BWP for the PUCCH retransmissions.

Aspect 19 is an apparatus for wireless communication including at least one processor coupled to a memory and configured to implement a method as in any of aspects 1 to 18.

Aspect 20 is an apparatus for wireless communication including means for implementing a method as in any of aspects 1 to 18.

Aspect 21 is a non-transitory computer-readable medium storing computer executable code, where the code when executed by a processor causes the processor to implement a method as in any of aspects 1 to 18.

Aspect 22 is a method of wireless communication at a UE, including: receiving, from a network entity, an indication associated with a number of PUCCH retransmissions via a group-common DCI; and transmitting, to the network entity, one or more PUCCH retransmissions based on the received indication.

In aspect 23, the method of aspect 22 further includes: receiving, from the network entity, a configuration for a set of PUCCH resources, where the UE transmits the one or more PUCCH retransmissions based on the set of PUCCH resources.

In aspect 24, the method of aspect 22 or aspect 23 further includes that the indication corresponds to an integer N associated with the one or more PUCCH retransmissions, such that the UE transmits N PUCCH retransmissions or N−1 PUCCH retransmissions to the network entity.

In aspect 25, the method of any of aspects 22-24 further includes that the indication is an index that corresponds to one of multiple configured values for PUCCH retransmissions at the UE, and the UE transmits a configured value of PUCCH retransmissions based on the index.

In aspect 26, the method of any of aspects 22-25 further includes that the multiple configured values for PUCCH retransmissions are determined based on at least one of: UCI size, PUCCH format, UCI content, or PUCCH resource set.

In aspect 27, the method of any of aspects 22-26 further includes: determining whether to apply PUCCH retransmissions.

In aspect 28, the method of any of aspects 22-27 further includes that the determination whether to apply PUCCH retransmissions is based on whether the PUCCH retransmissions include UCI or UCI carrying CSI feedback.

In aspect 29, the method of any of aspects 22-28 further includes that the determination whether to apply PUCCH retransmissions is based on a PUCCH format for the PUCCH retransmissions.

In aspect 30, the method of any of aspects 22-29 further includes that the determination whether to apply PUCCH retransmissions is based on at least one of subcarrier spacing, frequency range, carrier frequency, or a BWP associated with the PUCCH retransmissions.

In aspect 31, the method of any of aspects 22-30 further includes that the determination whether to apply PUCCH retransmissions is based on a restriction configured by the network entity.

In aspect 32, the method of any of aspects 22-31 further includes that the restriction is configured by the network entity via RRC signaling.

In aspect 33, the method of any of aspects 22-32 further includes that the restriction is associated with UCI.

In aspect 34, the method of any of aspects 22-33 further includes that the restriction is associated with one or more PUCCH formats for the PUCCH retransmission.

In aspect 35, the method of any of aspects 22-34 further includes that the restriction is associated with at least one of subcarrier spacing, frequency range, carrier frequency, or a BWP for the PUCCH retransmissions.

Aspect 36 is an apparatus for wireless communication including at least one processor coupled to a memory and configured to implement a method as in any of aspects 22 to 35.

Aspect 37 is an apparatus for wireless communication including means for implementing a method as in any of aspects 22 to 35.

Aspect 38 is a non-transitory computer-readable medium storing computer executable code, where the code when executed by a processor causes the processor to implement a method as in any of aspects 22 to 35.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limite2d to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication at a network entity, comprising:
   memory; and
   at least one processor coupled to the memory and configured to:
      transmit, to a set of user equipments (UEs), an indication associated with a number of physical uplink control channel (PUCCH) retransmissions via group-common downlink control information (DCI), wherein the indication is an index that corresponds to one of multiple configured values of PUCCH retransmissions at each of one or more UEs in the set of UEs; and
      receive, from the one or more UEs in the set of UEs, a configured value of PUCCH retransmissions based on the index.

2. The apparatus of claim 1, wherein the at least one processor and the memory are further configured to:
   transmit, to the set of UEs, a configuration for a set of PUCCH resources for each UE in the set of UEs, wherein the network entity receives the configured value of PUCCH retransmissions from the one or more UEs based on the set of PUCCH resources configured for each UE in the set of UEs.

3. The apparatus of claim 1, wherein the configured value is one of the multiple configured values of PUCCH retransmissions.

4. The apparatus of claim 1, wherein the configured values of PUCCH retransmissions for at least two of the one or more UEs are different.

5. The apparatus of claim 1, wherein the at least one processor and the memory are further configured to:
   determine a channel quality for at least one uplink channel associated with each UE in the set of UEs; and
   determine, based on the channel quality for the at least one uplink channel, a value for the index.

6. The apparatus of claim 5, wherein the channel quality is determined based on channel measurement feedback received from at least one UE of the set of UEs or based on a channel history of at least one of the at least one uplink channel.

7. The apparatus of claim 1, wherein the indication applies to PUCCH retransmissions that include uplink control information (UCI).

8. The apparatus of claim 7, wherein the indication applies to the PUCCH retransmissions that include the UCI carrying channel state information (CSI) feedback.

9. The apparatus of claim 1, wherein the indication applies to PUCCH retransmissions using one or more PUCCH formats, or to PUCCH retransmissions using a short PUCCH format of the one or more PUCCH formats.

10. The apparatus of claim 1, wherein the indication applies to PUCCH retransmissions based on at least one of subcarrier spacing, frequency range, carrier frequency, or a bandwidth part (BWP) associated with the PUCCH retransmissions.

11. The apparatus of claim 1, wherein the at least one processor and the memory are further configured to:
    configure a restriction for each UE in the set of UEs for each UE to determine whether to transmit PUCCH retransmissions based on the indication.

12. The apparatus of claim 11, wherein the restriction is configured for each UE of the set of UEs via radio resource control (RRC) signaling.

13. The apparatus of claim 11, wherein the restriction is associated with uplink control information (UCI) or with one or more PUCCH formats for the PUCCH retransmissions.

14. The apparatus of claim 11, wherein the restriction is associated with at least one of subcarrier spacing, frequency range, carrier frequency, or a bandwidth part (BWP) for the PUCCH retransmissions.

15. A method of wireless communication at a network entity, comprising:
    transmitting, to a set of user equipments (UEs), an indication associated with a number of physical uplink control channel (PUCCH) retransmissions via group-common downlink control information (DCI), wherein the indication is an index that corresponds to one of multiple configured values for PUCCH retransmissions at each of one or more UEs in the set of UEs; and
    receiving, from the one or more UEs in the set of UEs, one or more PUCCH retransmissions based on the index.

16. An apparatus for wireless communication at a user equipment (UE), comprising:

memory; and at least one processor coupled to the memory and configured to:

receive, from a network entity, an indication associated with a number of physical uplink control channel (PUCCH) retransmissions via a group-common downlink control information (DCI), wherein the indication is an index that corresponds to one of multiple configured values for PUCCH retransmissions at the UE; and transmit, to the network entity, a configured value of the PUCCH retransmissions based on the index.

17. The apparatus of claim 16, wherein the at least one processor and the memory are further configured to:

receive, from the network entity, a configuration for a set of PUCCH resources, wherein the UE transmits the configured value of PUCCH retransmissions based on the set of PUCCH resources.

18. The apparatus of claim 16, wherein the configured value is one of the multiple configured values for the PUCCH retransmissions.

19. The apparatus of claim 16, wherein the multiple configured values for PUCCH retransmissions are determined based on at least one of: uplink control information (UCI) size, PUCCH format, UCI content, or PUCCH resource set.

20. The apparatus of claim 16, wherein the at least one processor and the memory are further configured to:

determine whether to apply PUCCH retransmissions.

21. The apparatus of claim 20, wherein the determination of whether to apply PUCCH retransmissions is based on whether the PUCCH retransmissions include uplink control information (UCI) or UCI carrying CSI feedback.

22. The apparatus of claim 20, wherein the determination of whether to apply PUCCH retransmissions is based on a PUCCH format for the PUCCH retransmissions.

23. The apparatus of claim 20, wherein the determination of whether to apply PUCCH retransmissions is based on at least one of subcarrier spacing, frequency range, carrier frequency, or a bandwidth part (BWP) associated with the PUCCH retransmissions.

24. The apparatus of claim 20, wherein the determination of whether to apply PUCCH retransmissions is based on a restriction configured by the network entity.

25. The apparatus of claim 24, wherein the restriction is configured by the network entity via radio resource control (RRC) signaling.

26. The apparatus of claim 24, wherein the restriction is associated with uplink control information (UCI) or is associated with one or more PUCCH formats for the PUCCH retransmission.

27. The apparatus of claim 24, wherein the restriction is associated with at least one of subcarrier spacing, frequency range, carrier frequency, or a bandwidth part (BWP) for the PUCCH retransmissions.

28. A method of wireless communication at a user equipment (UE), comprising:

receiving, from a network entity, an indication associated with a number of physical uplink control channel (PUCCH) retransmissions via a group-common downlink control information (DCI), wherein the indication is an index that corresponds to one of multiple configured values for PUCCH retransmissions at the UE; and transmitting, to the network entity, a configured value of the PUCCH retransmissions based on the index.

* * * * *